United States Patent
Barber et al.

(10) Patent No.: US 10,083,203 B2
(45) Date of Patent: *Sep. 25, 2018

(54) REDUCING THE COST OF UPDATE, DELETE, AND APPEND-ONLY INSERT OPERATIONS IN A DATABASE

(71) Applicant: International Business Machines Corporation, Armonk, NY (US)

(72) Inventors: Ronald J. Barber, San Jose, CA (US); Bishwaranjan Bhattacharjee, Yorktown Heights, NY (US); Guy M. Lohman, San Jose, CA (US); Chandrasekaran Mohan, Saratoga, CA (US); Vijayshankar Raman, Sunnyvale, CA (US); Mohammad Sadoghi Hamedani, Chappaqua, NY (US); Richard S. Sidle, Mountain View, CA (US); Adam J. Storm, Toronto (CA); Xun Xue, Markham (CA)

(73) Assignee: International Business Machines Corporation, Armonk, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 14/823,607

(22) Filed: Aug. 11, 2015

(65) Prior Publication Data
US 2017/0046377 A1    Feb. 16, 2017

(51) Int. Cl.
*G06F 7/00*     (2006.01)
*G06F 17/00*    (2006.01)
*G06F 17/30*    (2006.01)

(52) U.S. Cl.
CPC ...... *G06F 17/30377* (2013.01); *G06F 17/303* (2013.01); *G06F 17/30303* (2013.01);
(Continued)

(58) Field of Classification Search
None
See application file for complete search history.

(56) References Cited

U.S. PATENT DOCUMENTS 8,010,497 B2    8/2011  Verma et al.
9,165,050 B2 *  10/2015 Schreter ............ G06F 17/30595
(Continued)

OTHER PUBLICATIONS

Bernstein et al., "Concurrency Control and Recovery in Database Systems," Microsoft Research, Addison-Wesley Publishing Company, © 1987 by Philip A. Bernstein, Vassos Hadzilacos, and Nathan Goodman, 2 pp. http://research.microsoft.com/en-us/people/philbe/ccontrol.aspx.
(Continued)

*Primary Examiner* — Tuan A Pham
(74) *Attorney, Agent, or Firm* — Christopher M. Coy

(57) ABSTRACT

A first request may be received to update a first set of values. The first set of values may be stored at a first location within a first data page of a database. The first location may be read-only. In response to the receiving of the first request, a first set of records may be inserted into a second data page. The first set of records may include the update of the first set of values. In response to the inserting, a forward pointer may be stored in the first data page that points to the first set of records on the second data page. One or more committed values may be identified on the second data page. In response to the identifying, the one or more committed values may be merged from the second data page to a third data page.

11 Claims, 10 Drawing Sheets

(52) U.S. Cl.
CPC .. *G06F 17/30348* (2013.01); *G06F 17/30368* (2013.01); *G06F 17/30371* (2013.01); *G06F 17/30504* (2013.01)

(56) References Cited

U.S. PATENT DOCUMENTS

| | | | |
|---|---|---|---|
| 9,342,549 B2 | 5/2016 | Pathak et al. | |
| 9,430,544 B2 | 8/2016 | Li et al. | |
| 2005/0055531 A1 | 3/2005 | Asami et al. | |
| 2005/0234930 A1 | 10/2005 | Hop Hing et al. | |
| 2008/0228793 A1 | 9/2008 | Hing et al. | |
| 2011/0161379 A1 | 6/2011 | Grund et al. | |
| 2011/0276611 A1* | 11/2011 | Verma | G06F 17/30227 707/826 |
| 2013/0179473 A1* | 7/2013 | Heman | G06F 17/30345 707/797 |
| 2015/0026141 A1 | 1/2015 | Blanco et al. | |
| 2015/0046413 A1 | 2/2015 | Andrei et al. | |
| 2016/0117779 A1 | 4/2016 | Sale | |

OTHER PUBLICATIONS

Cahill et al., "Serializable Isolation for Snapshot Databases," ACM Transactions on Database Systems, vol. 34, No. 4, Article 20, Dec. 2009, pp. 1-42, DOI = 10.1145/1620585.1620587 http://doi.acm.org/10.1145/1620585.1620587.
Colgan, "Oracle Database In-Memory option," An Oracle White Paper, Oct. 2014, Copyright © 2013, Oracle, pp. 1-30, Redwood Shores, CA.
Farber et al., "The SAP HANA Database—An Architecture Overview," Bulletin of the IEEE Computer Society Technical Committee on Data Engineering, Copyright © 2012, IEEE, pp. 1-6.
Gupta et al., "Mesa: Geo-Replicated, Near Real-Time, Scalable Data Warehousing," Proceedings of the VLDB Endowment, vol. 7, No. 12, Copyright © 2014, VLDB Endowment, pp. 1259-1270.
Larson et al., "High-Performance Concurrency Control Mechanisms for Main-Memory Databases," Proceedings of the VLDB Endowment, vol. 5, No. 4, Copyright © 2011, VLDB Endowment, pp. 298-309.
Lahiri, "Oracle In-Memory Strategy: In-Memory in All Tiers, All Workloads," Oracle, Copyright © 2014, pp. 1-76, <http://www.adms-conf.org/2014-slides/VLDB-2014-Oracle-ADMS-Keynote-Public.pdf>.
Mohan et al, "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.
Plattner, "The Impact of Columnar In-Memory Databases on Enterprise Systems," Proceedings of the VLDB Endowment, vol. 7, No. 13, Copyright © 2014, VLDB Endowment, pp. 1722-1729.
Goel et al, "SAP HANA: Delivering a Data Platform for Enterprise Applications on Modern Hardware", HANA Platform Team, SAP, Copyright 2014 SAP AG, 19 pages.
Barber et al., "Reducing the Cost of Update, Delete, and Append-Only Insert Operations in a Database," U.S. Appl. No. 15/366,562, filed Dec. 1, 2016.
Accelerated Examination Support Document dated Dec. 1, 2016 for U.S. Appl. No. 15/366,562, 11 pages.
Barber et al., "Reducing the Cost of Update, Delete, and Append-Only Insert Operations in a Database," U.S. Appl. No. 15/366,611, filed Dec. 1, 2016.
Accelerated Examination Support Document dated Dec. 1, 2016 for U.S. Appl. No. 15/366,611, 11 pages.
List of IBM Patents or Patent Applications Treated as Related, signed Dec. 1, 2016, 2 pages.
Barber, et al., "Reducing the Cost of Update, Delete, and Append-Only Insert Operations in a Database," U.S. Appl. No. 14/974,612, filed Dec. 18, 2015.
List of IBM Patents or Patent Publications Treated as Related, Dated Dec. 12, 2015, 2 pages.
"Accelerated Examination Support Document," International Business Machines Corporation, Dated Nov. 27, 2015, 7 pages.

* cited by examiner

Read-only Data Page 301

| TSN | Tuplestate | Indirection | Schema Encoding | Original Insertion StartTime | Latest Update StartTime | C1 | C2 | C3 |
|---|---|---|---|---|---|---|---|---|
| 1 |  |  |  | 1: 02 pm |  | x1 | y1 | z1 |
| 2 |  | 101 |  | 8:00 am | 1: 15 pm | x2 | y2 | z2 |
| 3 |  | 103 |  | 1: 05 pm | 2: 05 pm | x3 | y3 | z3 |

Append-only Data Page 303

| TSN | Tuplestate | Indirection | Schema Encoding | Start time | C1 | C3 |
|---|---|---|---|---|---|---|
| 100 |  | 2 | 100* | 8: 00 am | x2 |  |
| 101 |  | 100 | 100 | 1: 15 pm | x2a |  |
| 102 |  | 3 | 101* | 1: 05 pm | x3 | z3 |
| 103 |  | 102 | 101 | 2: 05 pm | x3a | z3a |

REDUCING THE COST OF UPDATE, DELETE, AND APPEND-ONLY INSERT OPERATIONS IN A DATABASE

BACKGROUND

This disclosure relates generally to database management systems, and more specifically, to reducing the cost of update delete, and append-only insert operations in a database.

Database manager modules may perform the two functions of accessing and modifying data from a database. Database managers may access data by selecting and delivering particular database records requested by a user based on a query statement. The query statement specifies the particular attributes (e.g., columns), table, and query conditions that a user desires. Database managers may modify data by inserting new database records (rows) in a table, updating values within the database records, or deleting particular database records from a table matching specified query conditions.

In a database management system, many users may access or modify the same data concurrently (i.e., in parallel). Unless some kind of restriction is imposed on the activity of user transactions, data in the system may be modified in some unintended way. For example, application A may update a value in a database, and application B may read that value before the value was committed (i.e., before the associated transaction was completed). If the value of A is not later committed, the calculations performed by B are based on uncommitted and presumably invalid data. Accordingly, database management systems may utilize concurrency control schemes to maintain database consistency and coordinate user transactions.

SUMMARY

One or more embodiments are directed to a computer-implemented method, a system, and a computer program product. A first request may be received to update a first set of values. The first set of values may be stored at a first location within a first data page of a database. The first location may be read-only. In response to the receiving of the first request, a first set of records may be inserted into a second data page. The first set of records may include the update of the first set of values. In response to the inserting, a forward pointer may be stored in the first data page that points to the first set of records on the second data page. One or more committed values may be identified on the second data page. In response to the identifying, the one or more committed values may be merged from the second data page to a third data page.

BRIEF DESCRIPTION OF THE DRAWINGS

FIG. 3B is a diagram of the read-only data page and the append-only data page of FIG. 3A, which illustrates an additional subsequent update (or delete) of a second set of values.

Figure 1:
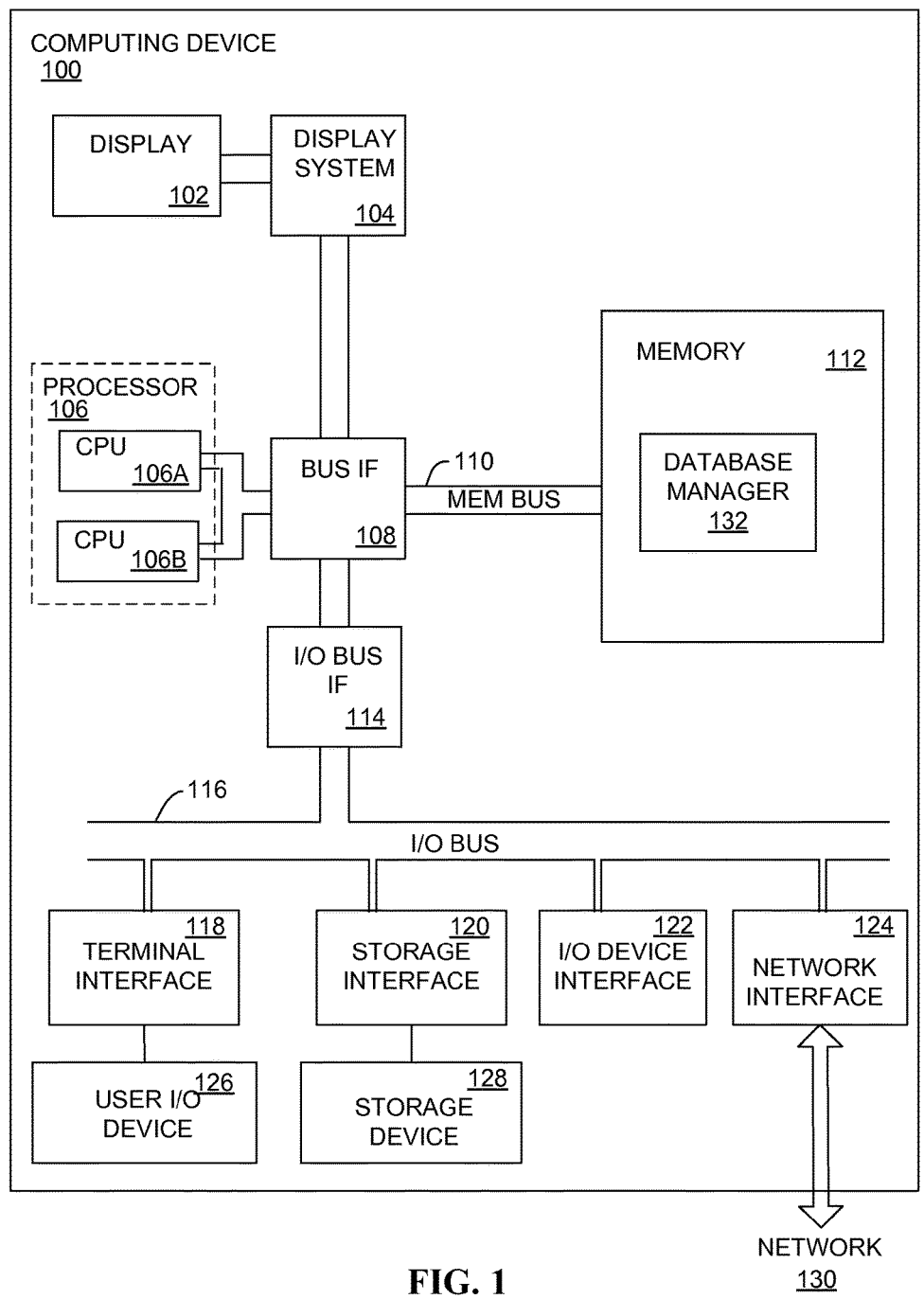
FIG. 1 is a block diagram of a computing device that includes a database manager, according to embodiments.

While embodiments described herein are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database management systems, more particular aspects relate to reducing the cost of update, delete, and append-only insert operations in a database. While the present disclosure is not necessarily limited to such applications, various aspects of the disclosure may be appreciated through a discussion of various examples using this context.

Database management systems may employ various mechanisms to enhance concurrency control. For example, a database system may utilize locks or latches for particular transactions. A lock occurs at the database record (or bucket) level and keeps two or more transactions from accessing the same records. Accessing the same record may cause corrupted or inconsistent data. For example, application A may start a transaction (e.g., update a value) and application B may try to modify the same value that application A is in the middle of modifying. However, application A may be the owner of a lock such that application B may not be able to modify the data until application A's transaction is complete. A latch occurs at the physical data page level, and keeps two or more transactions from accessing data on the same data page. Locking and latching, however, may cause unnecessary reader and/or writer transaction contention such that concurrency flow is diminished (e.g., a user may have to wait a long period of time before starting a transaction).

In a multi-version concurrency environment, each user may view a snapshot version of a database as it exists at a particular time. A first user may desire to view a record, while a second user may write (e.g., update) a value in the record. In this situation, the first user may not view changes of the second user until the second user's transaction is completed. In these environments, data is not overwritten, but old data is flagged as obsolete and a new version is added elsewhere. This may allow the first user to read the data without locking even if the data was modified during the first reader's access, which may reduce reader and writer contention. However, multi-version environments may still require latches and locks for two transactions that write to the same location. Even though writing transactions may never block reading transactions and reading transactions may not block writing transactions, control mechanisms may be utilized for two writing transactions. Embodiments of the present disclosure are therefore directed to utilizing a concurrency control scheme for update, delete, and append-only insert operations such that no locks or exclusive latches are utilized, thereby leading to enhanced concurrency flow.

Online transaction processing (OLTP) databases are characterized by frequent updates and small-sized queries. Such databases may include a large quantity of concurrent users with small transaction times. Accordingly, fast response times and robust concurrency control may be needed. Alternatively, online analytical processing (OLAP) databases are characterized by intermittent reads for historical data in a database warehouses and users may utilize analytical or large-sized queries. Because of the complex nature of analytical queries, OLAP databases may demand fast response times and effective query execution plans. In some embodiments of the present disclosure, a database may support both analytical queries and OLTP-type queries. Further, embodiments may support snapshot queries (e.g., for point-in-time recovery, etc.), all of which may reduce the cost of update and/or delete operations.

FIG. 1 is a block diagram of a computing device that includes a database manager 132, according to embodiments. The components of the computing device 100 can include one or more processors 106, a memory 112, a terminal interface 118, a storage interface 120, an Input/Output ("I/O") device interface 122, and a network interface 124, all of which are communicatively coupled, directly or indirectly, for inter-component communication via a memory bus 110, an I/O bus 116, bus interface unit ("IF") 108, and an I/O bus interface unit 114.

The computing device 100 may include one or more general-purpose programmable central processing units (CPUs) 106A and 106B, herein generically referred to as the processor 106. In an embodiment, the computing device 100 may contain multiple processors; however, in another embodiment, the computing device 100 may alternatively be a single CPU device. Each processor 106 executes instructions stored in the memory 112.

The computing device 100 may include a bus interface unit 108 to handle communications among the processor 106, the memory 112, the display system 104, and the I/O bus interface unit 114. The I/O bus interface unit 114 may be coupled with the I/O bus 116 for transferring data to and from the various I/O units. The I/O bus interface unit 114 may communicate with multiple I/O interface units 118, 120, 122, and 124, which are also known as I/O processors (IOPs) or I/O adapters (IOAs), through the I/O bus 116. The display system 104 may include a display controller, a display memory, or both. The display controller may provide video, audio, or both types of data to a display device 102. The display memory may be a dedicated memory for buffering video data. The display system 104 may be coupled with a display device 102, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 104 may be on board an integrated circuit that also includes the processor 106. In addition, one or more of the functions provided by the bus interface unit 108 may be on board an integrated circuit that also includes the processor 106.

The I/O interface units support communication with a variety of storage and I/O devices. For example, the terminal interface unit 118 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 126 and the computing device 100, may receive output data via the user output devices. For example, a user interface may be presented via the user I/O device 126, such as displayed on a display device, played via a speaker, or printed via a printer.

The storage interface 120 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 may be implemented via any type of secondary storage device. The contents of the memory 112, or any portion thereof, may be stored to and retrieved from the storage device 128 as needed. The I/O device interface 122 provides an interface to any of various other I/O devices or devices of other types, such as printers or fax machines. The network interface 124 provides one or more communication paths from the computing device 100 to other digital devices and computer systems.

Although the computing device 100 shown in FIG. 1 illustrates a particular bus structure providing a direct communication path among the processors 106, the memory 112, the bus interface 108, the display system 104, and the I/O bus interface unit 114, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 114 and the I/O bus 108 are shown as single respective units, the computing device 100, may include multiple I/O bus interface units 114 and/or multiple I/O buses 116. While multiple I/O interface units are shown, which separate the I/O bus 116 from various communication paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

In an embodiment, the memory 112 may include a random-access semiconductor memory, storage device, or storage medium (either volatile or non-volatile) for storing or encoding data and programs. In another embodiment, the memory 112 represents the entire virtual memory of the computing device 100, and may also include the virtual memory of other computer systems coupled to the computing device 100 or connected via a network 130. The memory 112 may be a single monolithic entity, but in other embodiments the memory 112 may include a hierarchy of caches and other memory devices. For example, memory may exist in multiple levels of caches, and these caches may be further divided by function, so that one cache holds instructions while another holds non-instruction data, which is used by the processor. Memory 112 may be further distributed and associated with different CPUs or sets of CPUs, as is known in any various so-called non-uniform memory access (NUMA) computer architectures.

Figure 2:
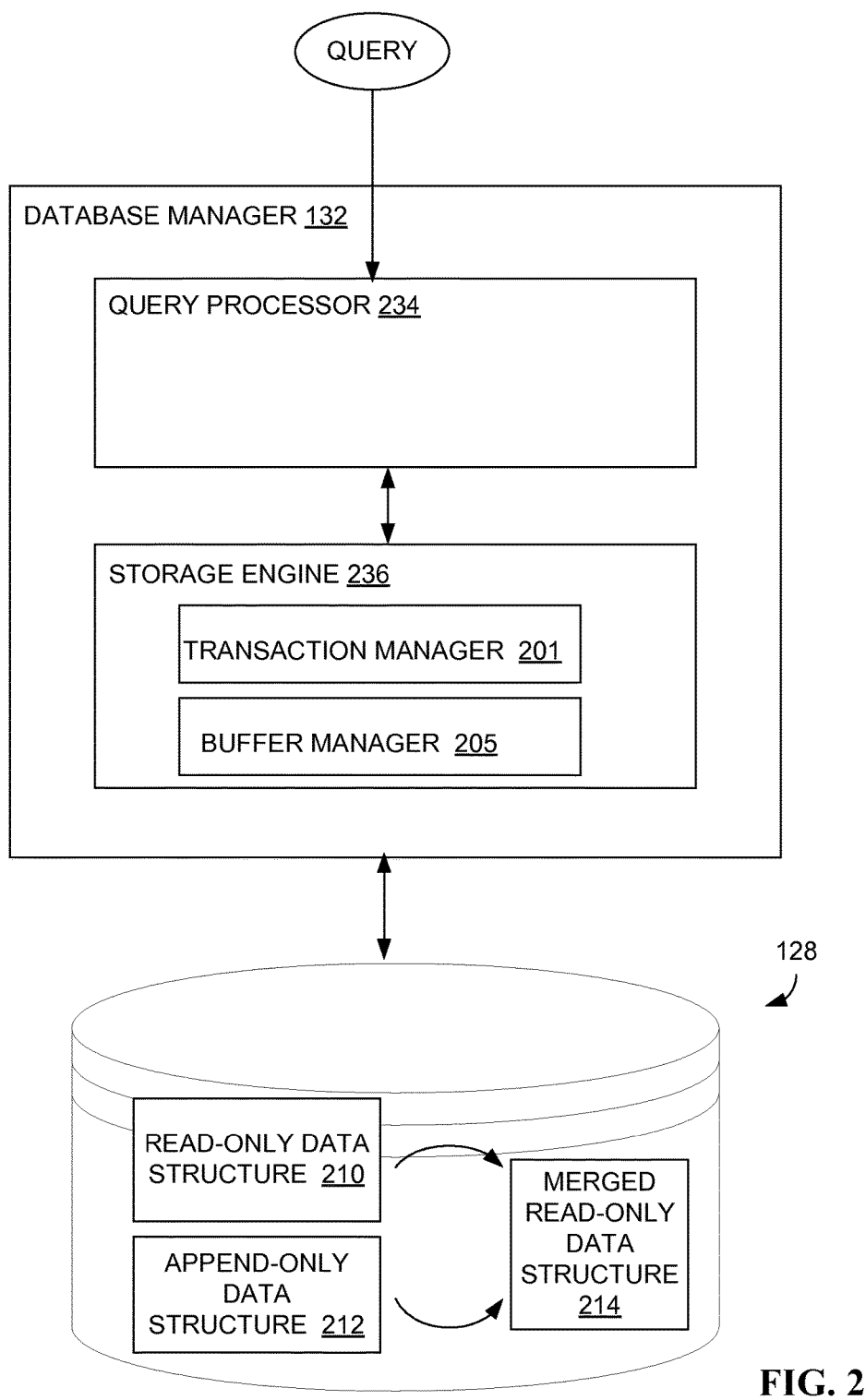
FIG. 2 is a block diagram of the database manager of FIG. 1, according to embodiments.

The memory 112 may store all or a portion of the components and data shown in FIG. 2, such as the database manager 132, which is described in more detail below. These programs and data are illustrated in FIG. 2 as being included within the memory 112 in the computing device 100; however, in other embodiments, some or all of them may be on different computer systems and may be accessed remotely, e.g., via a network 130. The computing device 100 may use virtual addressing mechanisms that allow the programs of the computing device 100 to behave as if they only have access to a large, single storage entity instead of access to multiple, smaller storage entities. Thus, while the components and data shown in FIG. 2 are illustrated as being included within the memory 112, these components and data are not necessarily all completely contained in the same storage device at the same time. Although the components and data shown in FIG. 2 are illustrated as being separate entities, in other embodiments some of them, portions of some of them, or all of them may be packaged together.

In an embodiment, the components and data shown in FIG. 2 may include instructions or statements that execute on the processor 106 or instructions or statements that are interpreted by instructions or statements that execute on the processor 106 to carry out the functions as further described below. In another embodiment, the components shown in FIG. 2 may be implemented in hardware via semiconductor devices, chips, logical gates, circuits, circuit cards, and/or other physical hardware devices in lieu of, or in addition to, a processor-based system. In an embodiment, the components shown in FIG. 2 may include data in addition to instructions or statements.

FIG. 1 is intended to depict representative components of the computing device 100. Individual components, however, may have greater complexity than represented in FIG. 1. In FIG. 1, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different ways, including using various computer applications, routines, components, programs, objects, modules, data pages etc., which may be referred to herein as "software," "computer programs," or simply "programs."

FIG. 2 is a block diagram of the database manager 132 of FIG. 1, according to embodiments. In an embodiment, the database manager 132 may include a query processor 234 and a storage engine 236, which may interact with a one or more data structures (e.g., read-only data structure 210, append-only data structure 212, and the merged read-only data structure 214) within a storage device 128. A data structure as disclosed herein may mean a data page, data table, column of a table, file, index, set of records, or other structure for organizing data. In some embodiments, the read-only data structure 210, the append-only data structure 212, and the merged read-only data structure may be located in the memory 112 of FIG. 1 instead of or in addition to the storage device 128. Further, the components (e.g., query processor 234) within the database manager 132 are by way of illustration and therefore there may be more or less components within the database manager 132 as illustrated. As disclosed herein, the term "append-only" may mean that data can only be added, in any order (including out of order) to the append-only data structure, but not removed. Append-only data structures may accordingly include records that are inserted when a request for an update and/or delete is initiated. The term "read-only" may refer to a data structure that can be read but cannot be written to.

In various embodiments, these components and data are operable to receive a query request to update and/or delete values located at a read-only location (e.g., column, field, record, etc.) within a data page, insert corresponding records to the append-only data structure 212, and periodically merge committed data values from the append-only data structure 212 (and the read-only data structure 210) to the merged read-only data structure 214, as described in more detail below.

Consistent with some embodiments, a user may issue an update and/or delete (or snapshot) query request and the database manager 132 may receive the query request to modify a set of values located within the read-only data structure 210. As disclosed herein, the term "set of" may mean one or more. The query may be written in any suitable query language that corresponds to the database type. For example, the query request may be written in structured query language (SQL) for relational databases, data manipulation language (DML) for inserting, updating, or deleting database records in relational databases, multidimensional expression (MDX) for multidimensional or online analytical procession (OLAP) databases, online transactional processing databases (OLTP), or any other language for any other database.

In an embodiment, the database manager 132 may initiate the process of selecting the one or more database records or values that are being requested from the query request by utilizing the query processor 234. In some embodiments, the query processor 234 may generate several plans to access values and execute the most efficient plan, as explained further below. Alternatively, the query processor 234 may generate an efficient plan, which is not necessarily the most efficient. The query processor 234 may include such components as a compiler, a parser engine, an optimizer engine, and an execution engine. A compiler may receive the query request and convert the query request into machine-readable object code.

The parser engine may receive the compiled query request and check that the query request is correctly specified, resolve names and references, and convert the query request into a format utilized by the optimizer engine. The parser engine may convert the query request into a data structure, which gives a structural representation of the query request. For example, the data page may be an abstract syntax tree, parse tree, or other data structure. In various embodiments, the parser engine may make a plurality of checks, including a syntax check, a check determining whether the query request is meaningful (e.g., whether objects and columns in the query request exist), and a shared pool check.

In various embodiments, the optimizer engine receives the parsed query request and in response determines an efficient or most efficient query execution plan for selecting the one or more values based on which values are requested in the query request. This may occur by determining the cost of each query execution plan through an estimator. In an embodiment, an estimator may estimate the cost of each query execution plan by measuring the units of work or resources used. For example, the estimator may use disk I/O, central processing unit (CPU) usage, and memory usage to calculate units of work. The cost of a query execution plan may accordingly represent a number of work units that are expected to be absorbed when the query request is executed and the results produced. In an embodiment, the execution engine receives an efficient or most efficient query execution plan according to the optimizer engine, and executes the query against the read-only data structure 210 to find the requested values and against the append-only data structure 212 to insert corresponding records. The execution engine may also order tables in any particular join order according to any join method, which is chosen by the optimizer engine. For example, the execution engine may run a nested loop, sort merge, or hash method as the join method chosen by the optimizer engine.

In various embodiments, the storage engine 236 utilizes the chosen query execution plan from the query processor 234 to select one or more database records or values from the data pages (e.g., read-only data structured 210) within the storage device 128. In some embodiments, the storage engine 236 is a part of the execution engine of the query processor 234. The storage engine 236 provides an interface between low level data stored in the storage device 128 and higher level applications. The storage engine 236 may interface with the data pages (e.g., the read-only data structure 210) by translating various query requests into low-level file system commands.

The transaction manager 201 of the storage engine 236 may be responsible for coordinating various transactions (also known as commit cycles) within the data structures. A transaction is one or more operations that make up a unit of work performed against a storage device 128 or memory. For example, a transaction may include the I/O operations of deleting a value, and updating a corresponding record with a new value. In various embodiments, a transaction may be in multiple states. For example, the transaction may be in in active state (uncommitted state). In an active state, a transaction has begun and is currently being executed by the transaction manager 201, which may be the initial state of every transaction. The transaction may also be in a partially committed state (uncommitted state). In a partially committed state, the transaction manager 201 may execute its final operation without performing various checks (e.g., the consistency state of a data page after applying output of the transaction on the data page). Moreover, the transaction may be in a committed state. If the transaction manager 201 executes all of its operations successfully, which includes successfully performing various checks, then the transaction may be in a committed state. Accordingly, all of the committed transactions may permanently be applied to the data pages within the storage device 128 or memory. The transaction may also be in a failed state (uncommitted state). In an uncommitted state, some operations may be performed while others are not finished. In embodiments and as described in more detail below, uncommitted values may not be merged to the merged read-only data structure 214. Accordingly, there may be no need for the database manager 132 to "rollback" any uncommitted transactions the transaction manager 201 to place any data structure in a state prior to the start of the execution of the transaction (i.e., aborted state), which may increase database efficiency.

In some embodiments, the transaction manager 201 may also be responsible for inserting a first set of records into the append-only data structure 212 in response to a user request to update and/or delete particular values, as described in more detail below.

Consistent with some embodiments, the transaction manager 201 may communicate with a log manager (not shown) to write various transactions to a transaction log (also known as a journal, commit log, or journal receiver). The log manager may be responsible for that actual writing of various transaction operations to the transaction log. The transaction log may include entries (e.g., log sequence numbers (LSNs)) that specify identification numbers of database record(s) (e.g., relative record numbers (RRNs)) and corresponding operational changes to the data pages. For example, the operational changes that may be logged are insert, update, or delete operations of various database records. A RRN may indicate the database record's logical position in a data page. For example, relative record numbers of the first, third, and fifth database records in a table may be 1, 3, and 5 respectively. The entries may also specify a time stamp to determine when the operational change occurred. These entries may be useful for recovery purposes (e.g., snapshot and point-in-time recovery).

The buffer manager 205 may be responsible for interfacing with the storage device 128 by reading storage device 128 data structures (e.g., read-only data pages) into main memory data structures. In various embodiments, the buffer manager 205 may select the one or more values from the different types of database data pages using various selection techniques. For example, the one or more database records may be selected from a database table data structure, and may have a RRN, as described above. In another embodiment, the data structure may be a simple file such as a binary large object (BLOB), or a character large object (CLOB). Alternatively, the data structure may be arrays with fixed-length entries, or a linked list. In an embodiment, the buffer manager 205 may utilize index data structures to access and select the corresponding set of database records, which groups database records together thereby making it easier for database record access. For example, the buffer manager 205 may access a database record by utilizing a hash-based index, or a tree-based index such as a B+ tree. Indexes may also be clustered, non-clustered, primary, secondary, dense, sparse or configured in any other manner. In an alternative embodiment, the buffer manager 205 may utilize a full-table scan, wherein the buffer manager 205 scans database records one at a time until a desired one or more database records are selected. In other embodiments, the index may be an offset from a starting table location based on the size of a database record multiplied by the number of database records.

The buffer manager 205 may select values from the data structures (e.g., read-only data structure 210) in various manners. For example, the buffer manager 205 may directly interface with the data pages through a block device, such as a raw access storage device, wherein the buffer manager 205 bypasses the operating system's caches and buffers and accesses the set of values (also known as a disk block or physical record). Alternatively, the buffer manager 205 may select the set of values through a component of an operating system, called a disk manager, wherein the disk manager receives the low-level file system commands from the buffer manager 205 and manages disk space for storage in the storage device 128. In some embodiments, the database manager may not include the buffer manager 205, as a database may be in-memory and require no buffer pool.

Figure 3A:
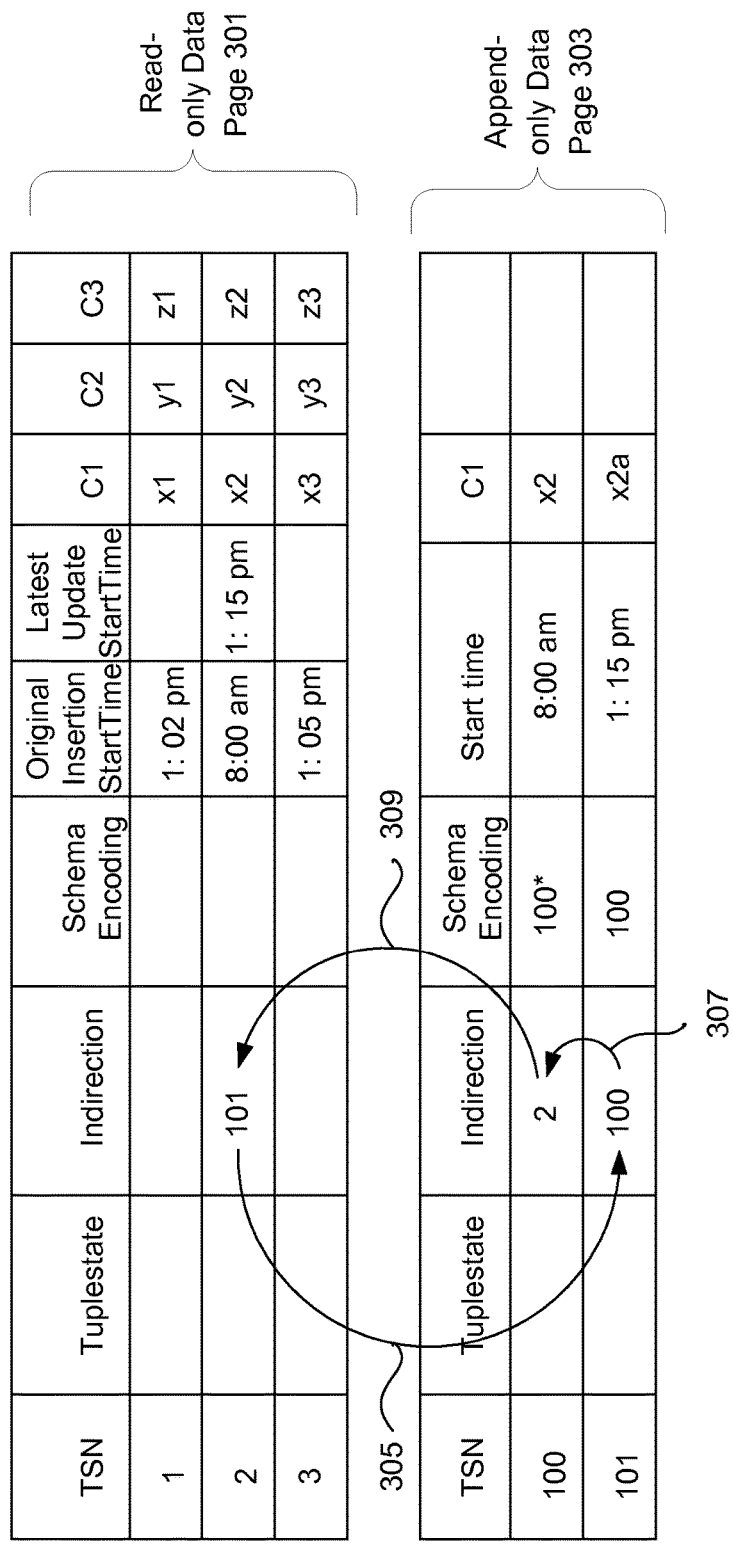
FIG. 3A is a diagram of an example read-only data page and an append-only data page that illustrates an update (or delete) of a particular value.

FIG. 3A is a diagram of an example read-only data page and an append-only data page that illustrates an update (or delete) of a particular value. In some embodiments, and as illustrated in FIGS. 3A (and 3B and 3C), the append-only data pages and the read-only data pages may have identical data page formats (e.g., same column identifiers). In some embodiments, and as illustrated in FIGS. 3A (and 3B and 3C), the data pages may be column-oriented (columnar). As disclosed herein, the term "column-oriented," may mean that data values are stored in columns instead of rows or records on disk such that data can be accessed in columns. Column-oriented databases may efficiently read and/or write data to and from disk (e.g., storage device 128 of FIG. 2) and speed up the time it takes to return a query. Column-oriented databases may also be highly compressed, thereby being conducive to analytical queries.

The read-only data page 301 and append-only data page 303 may include various columns, such as a tuple sequence number (TSN) column, a "tuplestate" column, an "indirection" column, a "schema encoding" column, an original insertion and latest update "start time" column, and various data columns (e.g., C1, C2, and C3) that include various values (e.g., x1). The indirection column may include one or more forward pointers 305 and one or more backward pointers 307, and 309. A forward pointer may point to the record (within the append-only data page 303) of a most recent updated value and a backward pointer may point to the record of a prior version of a value. In some embodiments, as described above, a particular location (e.g., column) of the read-only data page 301 may not be read-only, but may allow for writes to occur (i.e., in-place update). For example, the indirection column on the read-only data page 301 may be updated for referencing a recent update of a value, as described in more detail below.

The TSN column includes an identifier that uniquely identifies each tuple (i.e., row or record) in the data page. For example, TSN "1" includes an original insertion start time of 1:02 p.m., a C1 value of x1, a C2 value of y1, and a C3 value of z1. In other embodiments, the identifier may be a row ID (RID), a relative record number (RRN), or other identifier. The read-only data page 301 may only be a portion of the entire read-only data page 301, which is shown for illustrative purposes (as well as the append-only data page 303 and merged read-only data page 321 of FIG. 3C). Accordingly, consistent with the illustration of FIG. 3C, the TSNs within the read-only data page 301 may continue from 4 to 99, at which point the TSN 100 continues within the append-only data page 303.

The tuplestate column identifies whether a particular value is part of a committed or uncommitted transaction. This may be useful for determining when values have been committed such that the values may be merged to a merged read-only data page, as described in more detail below. Moreover, there may be advantages of having a tuplestate column within the actual data page itself, as opposed to determining whether a value is committed via a transaction log. When a database manager performs an operation, the database manager may typically have to access data from a database table and then communicate separately with a log manager to determine whether a value is committed or not in a transaction log. This may cause slower response times and inefficiency. Accordingly, a tuplestate column may be implemented such that a database manager may quickly and efficiently determine the commitment status for a particular value associated with a particular transaction.

In some embodiments, the read-only data pages or append-only data pages may not include a tuplestate column. In these embodiments, the start time column of the append-only data pages may include time stamp information or a transaction ID. A transaction ID is a label for a transaction that is uncommitted. A time stamp indicates when a transaction began and when it ends (i.e., becomes committed). In the time stamp embodiments, the database manager may write the begin time and ad a flag within the timestamp to indicate that this is a begin time. Therefore, the database manager may be able to determine whether the values are committed or not by reading the time stamp information or transaction ID. Further, a transaction log may be consulted to determine a particular transaction state.

The indirection column of the read-only data page 301 may store a forward pointer that points to the most recent updated version of a value's record within the append-only data page 303. In an example illustration, for TSN 2, the indirection column stores a forward pointer 305 that points to TSN 101 corresponding to C1's most updated x2 value, which is x2a. Further, the indirection column of the append-only data page 303 may store backward pointers to previous versions of values for particular records. For example, within the append-only data page 303 for TSN 101, the backward pointer 307 points to TSN 100 such that value x2 may be accessed. In some embodiments, backward pointers may be utilized for snapshot query requests to recover previous versions of a value (e.g., for point-in-time recovery). A snapshot is a read-only image copy of a database or database values as they existed at a particular time. For snapshot embodiments, a database manager may receive a request to read a value. The snapshot request may specify a value as it existed at a particular time prior to an update (e.g., value x2 at 8:00 a.m.), which may be an older version of the value (e.g., x2a). The database manager may then determine that the value is within the append-only data page (e.g., via the schema encoding column), and then accesses the value from the append-only data page by utilizing a backward pointer that points from a latest updated value to an older version of a value.

Embedding forward and backward pointers within the data pages themselves may be for use in avoiding an update of a value (e.g., within an index) on columns that contain values that were not updated. For example, FIG. 3A illustrates that there only is an update to value x2 in the read-only data page 301. Accordingly, the append-only data page 303 may only store the column of values that have been updated or deleted, such as C1. Therefore, no values within C2 or C3 are written to the append-only data page 303 because of the forward and backward pointers in the indirection column. Further, by providing the indirection column within the read-only data page 301 and append-only data page 303, the database manager may quickly access the latest (or earliest) version of a value for a particular address, as opposed to consulting an index or other data structure, which may cause slower access of the data.

In some embodiments, the values within the indirection column are updated in-place (i.e., the indirection column is not read-only). In some embodiments, the size of this column may be less than or equal to 8 bytes each for each record. In some embodiments, a compare-and-swap (CAS) operator may modify the indirection column, which means that there may be no need for shifting or splitting the corresponding data pages. In some embodiments, the indirection column is pre-allocated for a range of records as soon as the first-in-time update occurs for the range of records. In some situations, indirection column read transactions may read data without holding any latches because reading 8 bytes or less may be atomic and writers may use CAS to update any values. The process of updating the indirection column is described in more detail below. The indirection column, in some embodiments, does not participate in the merging process, as described in more detail below.

In some embodiments, the indirection column for the read-only data pages (forward pointers) may be an in-memory column that is logged but persisted to a storage device (e.g., disk) like other data columns. The changes or modifications to this column may be logged and upon a crash, the database manager may re-construct the forward pointers using the log. In some embodiments, the indirection column may be a part of a separate index data page instead of the read-only data pages.

The schema encoding column stores information about which values of particular columns have been updated or deleted. This may be useful for determining which data page to access for a particular query. For example, if a database manager is trying to access a value based on a query that requests John's salary, but John's salary has never been modified (e.g., updated or deleted), then the database manager may read the schema encoding for John's salary, and determine that John's salary has never been modified. Accordingly, the database manager may not engage in reading the append-only data page 303 for John's salary because it has never been modified and instead read the read-only data page 301. In some embodiments, if a bit is set to 1, then the corresponding columns have been modified at least once. For example, "100" in the indirection column means that C1 has been modified at least once and C2 and C3 have not been modified. The schema encoding column may also be for use in determining a tuple count quantity in order to engage in a merge process, as described in more detail below.

The start time column for both the read-only data page 301 and the append-only data page 303 may be for use in determining when transactions start (and/or become committed) and implicitly end (e.g., for shared lock purposes, as described in more detail below). The original insertion start time column for the read-only data page 301 may indicate when a particular record or value was initially or originally written (e.g., merged from an append-only data page). The original insertion time may be a commit time of a transaction that originally wrote a value. Commit time, as disclosed herein, is the time a transaction or value became committed. The latest update start time column for the read-only data page 301 may indicate when a particular value or record's latest update occurred. The start time column for the append-only data page 303 may specify the commit time or transaction ID (and begin time) of the transaction that inserted the record. A transaction ID may be an identifier that indicates when a transaction has been initiated, but not committed. For example, if a transaction included the operations of delete then update, in response to a user issuing the update request to begin a transaction, the transaction ID and time may be written to the append-only data page 303. The append-only data page 303 may include entries for an original values before an update of the append-only data page and each associated update thereafter. In the example illustration of FIG. 3A, the value x2 may have originally been merged (e.g., copy on written) into the read-only data page 301 at 8:00 a.m. When x2 has been updated to x2a, the database manager may insert TSN 100 to the append-only data page 303 that includes the original x2 value along with the updated start time of 8 a.m. (which corresponds to the latest update start time of the read-only data page 301). The database manager may also, however, record that the update x2a (as part of TSN 101) occurred at 1:15 p.m.

There may be various advantages of not including an explicit end time column. For example, if there was an end time or stop column then that column would have to be pre-allocated even for those values that are never updated (or deleted), which may waste space. Furthermore, including an end time column may cause a database manager to perform in-place updates (e.g., write to the read-only data page 301), which may cause concurrency control problems, as described above. Moreover, if there was an end time column in the append-only data page 303 (indicating when an update is overwritten with a newer update), then there also may be a requirement to do in-place updates within the append-only data page 303, which may raise additional concurrency concerns. Although embodiments are directed to columns that do not include end time columns, in some embodiments, there may be end-time columns.

FIG. 3A illustrates that the only value that has been updated is value x2 of C1. In the example illustration of FIG. 3A, a user may have initiated a request to update a first value x2 within the read-only data page 301 with value x2a. In response to the database manager receiving the request, the database manager may insert a first set of records (e.g., TSN 100 and 101) into the append-only data page 303. The first set of records may include the original value (x2) and update of the value (x2a) associated with the first request. In some embodiments, however, the original value (x2) may not be written to append-only data page 303. As discussed above, the database manager may first write the original value x2 within the append-only data page 303, and may write the updated value x2a within the append-only data page 303 at a second subsequent time. In response to the inserting of records, the indirection column of TSN 2 may store a value of "101" in order for the forward pointer 305 to point to TSN 101, which corresponds to the latest value of x2, which is x2a. The append-only data page 303 of TSN 101 may also include an indirection column value of 100 in order for the backward pointer 307 to reference the older value x2 of TSN 100. TSN 100 may include an indirection column value of 2 in order to provide reference for the backward pointer 309 to TSN 2 within the read-only data page 301.

FIG. 3B is a diagram of the read-only data page and the append-only data page of FIG. 3A, which illustrates an additional subsequent update (or delete) of a second set of values. FIG. 3B illustrates that there have been additional updates for values x3 and z3 of the read-only data page 301. Accordingly, when the value x3 is updated from the read-only data page 301, the database manager may insert TSN 102 and write the value x3 in the append-only data page 303 and further insert TSN 103 and write the value x3a in the append-only data page 303. Within the indirection column of the read-only data page, for TSN 3, the value may be 103 and consequently, the forward pointer 311 may point to TSN 103 to reference that the most recent update to the address of the old value of x3 is now x3a. Further, the indirection column of the append-only data page 303 at TSN 103 may have a value of 102, which demonstrates that the backward pointer 315 is pointed to TSN 102 in order to be able retrieve an older value for a particular address (e.g., x3). Within the indirection column for TSN 102 the value is 3, which demonstrates that the pointer 313 will point to TSN 3 within the indirection column of the read-only data page 301 such that the x3 value may be obtained. The same process may be utilized for the update (or delete) of z3 to z3a.

In embodiments, updates and/or deletes may be cumulative. Cumulative updates are updates for different columns within the same record. For example, if a first transaction updates a value within column A of record R, and a second transaction updates a value within column B of record R, then the append-only data page 303 may write both values from columns A and B.

Figure 3C:
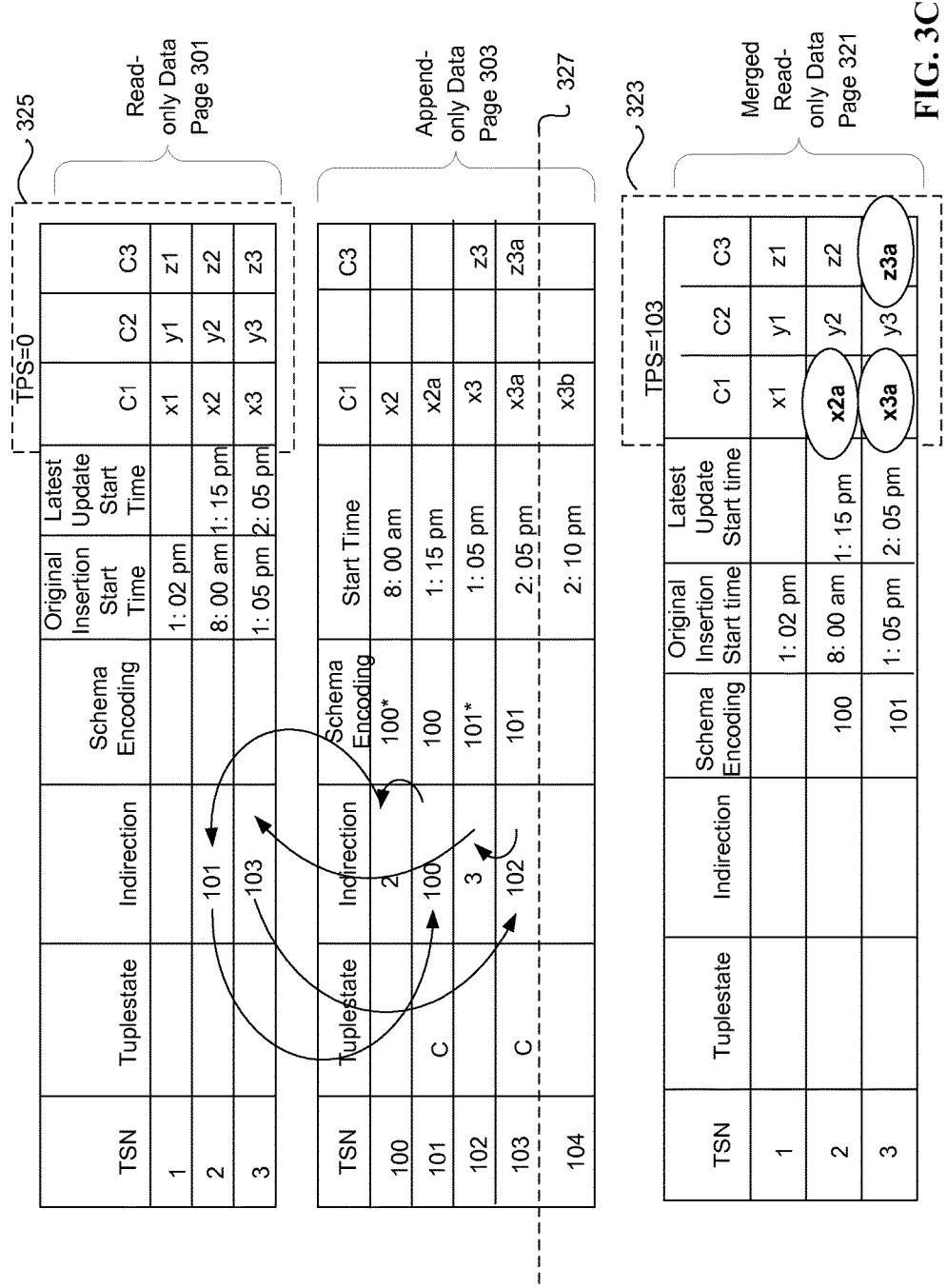
FIG. 3C is an example diagram of the read only data page of FIG. 3B and the append-only data page of FIG. 3B, which have been merged into a merged read-only data page.

FIG. 3C is an example diagram of the read-only data page of FIG. 3B and the append-only data page of FIG. 3B, which have been merged into a merged read-only data page 321. In some embodiments, the values for the read-only data page 301 that did not get updated (e.g., C2—y1, y2, and y3) may be merged to the read-only data page 321 using a copy-on-write method, which is illustrated within the merged read-only data page 321. For example, x1, y1, and z1, were not updated but were copied to the merged read-only data page 321. In some embodiments, however, the data that was not updated within the read-only data page 301 may not necessarily be copied to the merged read-only data page 321 but remain within the read-only data page 301 and a pointer within a page map may continue to reference this location such that queries continue to utilize the read-only data page 301. A page map as disclosed herein is a directory page utilized to access particular data pages. The page map may reference all relevant data pages that may be found for all columns of a given record. In some embodiments, data that was not updated may be copied to the merged read-only data page 321 only if there are multiple merged data pages. For example, if the database manager merges a range of records that spans 100 data pages, but only 20 of the data pages have actually been updated, then the 80 data pages that were not updated may still be applied to a merged read-only data page. In some embodiments, the 80 data pages that were not updated, do not have to be merged, and the original read-only pages will be sufficient and remain unchanged.

The merged read-only data page 321 also illustrates that most of the updates as inserted into the append-only data page 303 have been applied to the merged read-only data page 321, as shown by the values within the oval shapes—values x2a, x3a, and z3a are all mostly the latest versions of particular values and have been applied to the merged read-only data page 321. However, within the append-only data page 303 at the address of TSN 104 and C1, a more recent updated value for x3 has been written (x3b) and it has not been applied to the merged read-only data page 321. In some embodiments, this is because there has been a watermark 327 placed below TSN 103. A watermark as disclosed herein provides a point of reference below a record such that each of the committed values above the watermark will be applied to a merged read-only data page. Each record above the watermark will have also been scanned to determine the commitment status of a value for merging. The watermark location may be placed at any location according to any algorithm. For example, a database manager may identify a threshold quantity of committed values in an append-only data page, place the watermark at the threshold quantity, and merge the threshold quantity of committed values from the append-only data page to the merged read-only data page. In the example illustration of FIG. 3C, the database manager may have predetermined that anytime there are 3 committed values within the append-only data page 303, then the watermark 327 will be placed below the last TSN update. Accordingly, the database manager may determine that x2a, x3a, and z3a are all committed via the tuplestate column of the append-only data page 303 (e.g., the "C" for TSN 101 and TSN 103 may represent that the TSNs are committed). The database manager may then place the watermark 327 below TSN 103 such that all of the values that are committed above the watermark 327 may be applied to the merged read-only data page (i.e., applying batched updates). In some embodiments, only one committed value may be applied to the merged read only data page. In some embodiments, watermarking may be based on identifying a threshold quantity of records, determining which values of the records are committed, and merging the committed values. For example, using the illustration of FIG. 3C, the database manager may predetermine that it will scan the first 103 records, and the committed values corresponding to the records may then be merged.

Identifying one or more committed values, watermarking, and applying batched updates may be advantageous for reducing reader and writer contention and maintaining concurrency flow. For example, even though the database manager may batch values (e.g., identify a threshold quantity of values) to apply to the merged read-only data page 321, a transaction that performs work at substantially the same time (e.g., 0.3 seconds after the watermarking) as the batching may perform an update or delete operation, such as illustrated in FIG. 3C where value x3a has been updated to x3b, as shown by the TSN 104 that was inserted below the watermark 327 within the append-only data page 303. Therefore, even though the database manager may perform merging at the same time or substantially the same time as another transaction request, the request and/or merging may still proceed unabated without either action being blocked (e.g., being subject to locks, latches, or any control mechanism) in order to enhance concurrency flow.

The read-only data page 301 and the merged read-only data page 321 may include respective counters 325 and 323, hereinafter referred to as tail-data page sequence numbers (TPS). The TPS number may keep track of how many updated (or deleted) records from an append-only data page (or additionally within an original read-only data page) have been applied to a corresponding read-only data page. The TPS number may also or alternatively keep track of the watermarked record location. As illustrated in FIG. 3C, the TPS 325 indicates that 0 updates have been applied to the read-only data page 301. The TPS 323 indicates that TSN 103 is the watermarked location within the append-only data page 303. Therefore, 103 TSNs have been scanned for potential merging.

The TPS number may be utilized for various reasons. For example, the TPS number may be utilized to reference a "high watermark" (e.g., beginning, starting point, etc.) location for a subsequent batched update or merge. In the example illustration of FIG. 3C, within the merged read-only data page 321, the TPS number is 103, which may be for use in helping the database manager know that TSN 103 is where the database manager ended for a prior batched update. Accordingly, the database manager may perform another subsequent batched update at a second time beginning at TSN 104. The TPS number may also be utilized for interpreting a forward or backward pointer. For example, if a record within a read-only data page has an indirection pointer with a value of 55 (i.e., points to TSN 55), there may be two interpretations. For a transaction, if the database manager is reading read-only data pages with a TPS number of 0, then any update to data stored in the tuple having TSN 55 may not yet be reflected within the read-only data page. However, if the database manager is reading read-only data pages with a TPS number of 100, then any updates to data stored in the tuple having TSN 55 may have already been applied to the read-only data pages. Further, the TPS number may be utilized for verifying read consistency. For example, for a range of TSNs, all column data pages read must have the same TPS number in some situations, otherwise the read may be inconsistent.

In some embodiments, watermarking and merging may be based on a time threshold. For example, using the illustration of FIG. 3C, the database management system may include a timer and the database manager may poll the append-only data page 303 for all of the committed values every 5 minutes, 10 minutes, or any other suitable time frame. The database manager may determine that values x2a, x3a, and z3a have all been committed and consequently place the watermark 327 below TSN 103 after the threshold time period.

Figure 4:
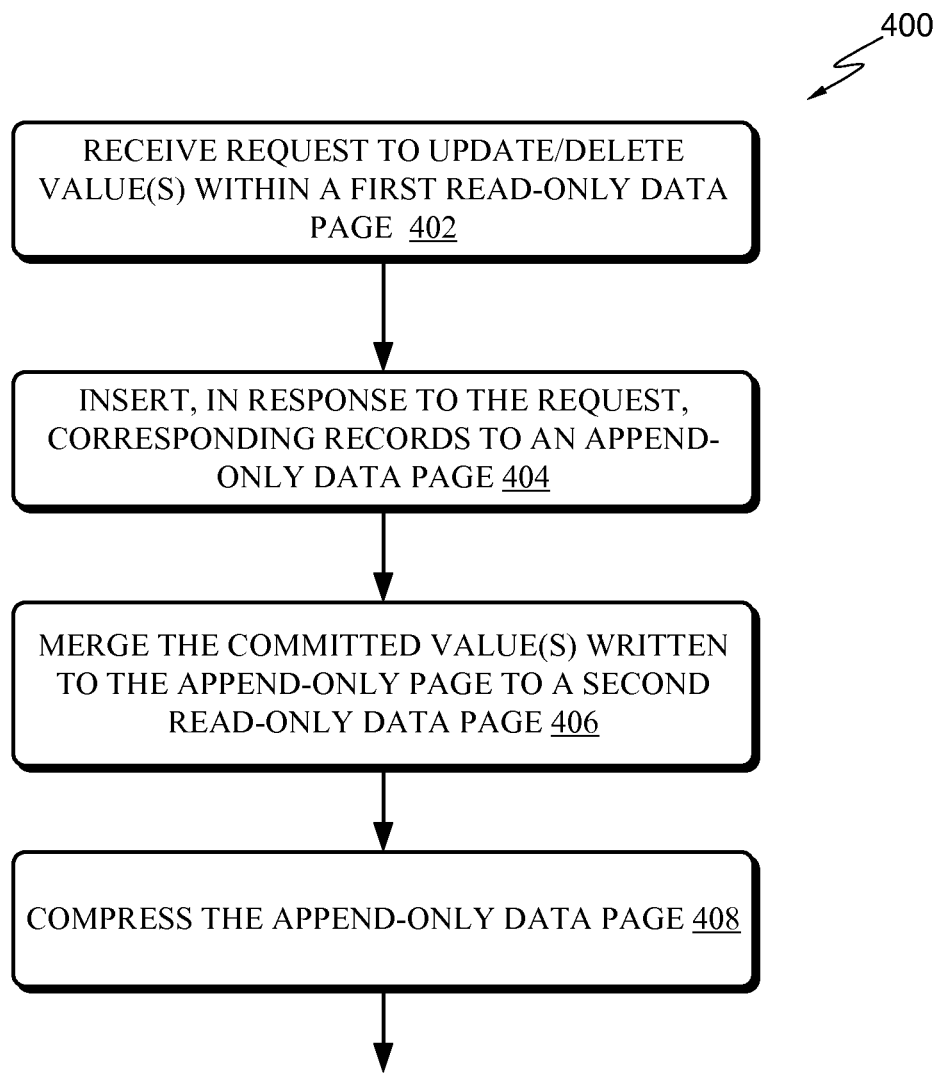
FIG. 4 is a flow diagram of an example process for updating a particular set of values into an append-only data page, merging the committed values to a read-only data page, and compressing the append-only data page.

FIG. 4 is a flow diagram of an example process 400 for updating a particular set of values into an append-only data page, merging the committed values to a read-only data page, and compressing the append-only data page. In some embodiments, the process 400 may begin at block 402 when a database manager receives a request to update or delete one or more values, the values being within a first read-only data page. The data within the first read-only data page may represent the database page as a user sees it, which may have been updated during a user transaction but because the database includes a read-only data page, the data page may correspond to old displayed data. In some embodiments, as described above, particular locations (e.g., indirection column) of the read-only page may not be read-only.

Per block 404, in response to the request performed at block 402, the database manager may insert corresponding records into an append-only data page. For example, a person's salary may be updated from a first figure (which may be shown on the first read-only data page) to a second figure. In response to the update salary request (e.g., block 402), the database manager may insert a TSN that includes the updated second salary figure into the append-only data page. However, the first figure may be continued to be displayed within the first read-only data page because it is a read-only data page. In some embodiments, a database manager may insert corresponding records into a data page, which is not necessarily an append-only data page.

Per block 406, the database manager may merge a committed set of values written to the append-only data page to a second read-only data page, as described above. For example, using the illustration above, the database manager may determine that the transaction responsible for updating the person's salary to the second figure is committed (e.g., using the tuplestate column of FIG. 3C). The database manager may also identify a threshold quantity of other committed values of other transactions within the append-only data page (e.g., utilizing the TPS number), and accordingly merge the threshold quantity of committed values from the append-only data page to a second read-only data page. For example, the first read-only data page that displayed the first salary figure, may now update the database such that a user may now view the second salary figure (i.e., the user is now viewing the second salary figure within the second read-only data page).

Per block 408, and in some embodiments, the database manager may compress, in response to the merging in block 406, the append-only data page to reduce a size of the append-only data page. Compression may be useful because append-only data pages may have the capacity to utilize a large quantity of storage space due to the nature of append-only data pages only being able to add data and not erase data. Compression of the append-only data page is discussed in more detail below.

Figure 5:
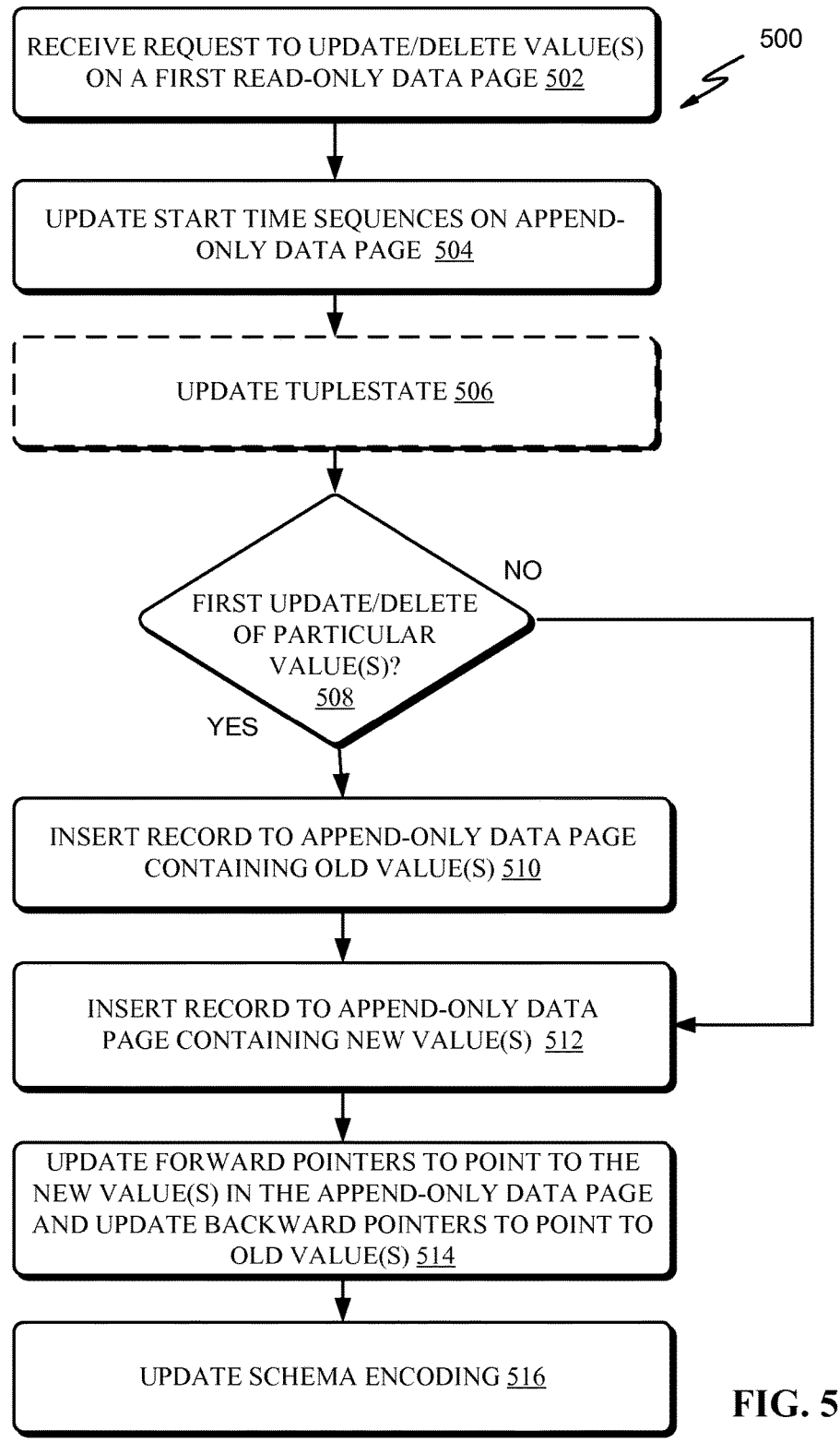
FIG. 5 is a flow diagram of an example process for updating or deleting one or more values for a particular transaction, according to embodiments.

FIG. 5 is a flow diagram of an example process 500 for updating or deleting one or more values for a particular transaction, according to embodiments. In some embodiments, the process 500 may begin at block 502 when a database manager receives a request to update and/or delete one or more values that are located on a first read-only data page. Per block 504, in response to the request, the database manager may update a start time sequence on corresponding append-only data pages (e.g., utilize the start time columns of FIG. 3A), which may specify either the transaction ID (from which the status and/or commit time of the transaction can be determined) or the commit time of the transaction. Per block 506, the database manager may update a tuplestate or transaction state indicator (e.g., utilize the tuplestate column of FIG. 3A), which may initially be updated to an uncommitted transaction state because the transaction has not yet completed. Per block 508, the database manager may determine whether the request to update and/or delete the particular values is the first time the particular values for a given record have been requested for an update and/or delete. If the particular values have been requested for an update and/or delete at a time prior to block 502, then per block 512, the database manager may insert a corresponding record to an append-only data page that contains new values for a given value because the old values would have already been written to the append-only data page with the prior request. Per block 510, if the particular values were requested for the first time for an update and/or delete operation, then the database manager may insert a corresponding record to an append-only data page that contains old values (e.g., in FIG. 3A, TSN 100 contains the old value x2). Per block 512, the database manager may further insert another record to the append-only data page that contains the new values (e.g., in FIG. 3A, TSN 100 contains the new value x2a).

Per block 514, the database manager may then update forward pointers (e.g., utilizing the indirection column of FIG. 3A) to point to the new values within the append-only data page (e.g., to select the new values for merging purposes), and may update backward pointers within the append-only data page to point to the older values (e.g., for snapshot point-in-time recovery purposes). Per block 516, the database manager may update schema encoding (e.g., utilize the schema encoding column of FIG. 3A) in order to keep track of which values of which columns have been updated or deleted, as described above. In some embodiments, the process 500 may continue and the database manager may update the tuplestate a second time by marking the transaction as committed in order to prepare for the merging process, as described in more detail below.

Figure 6:
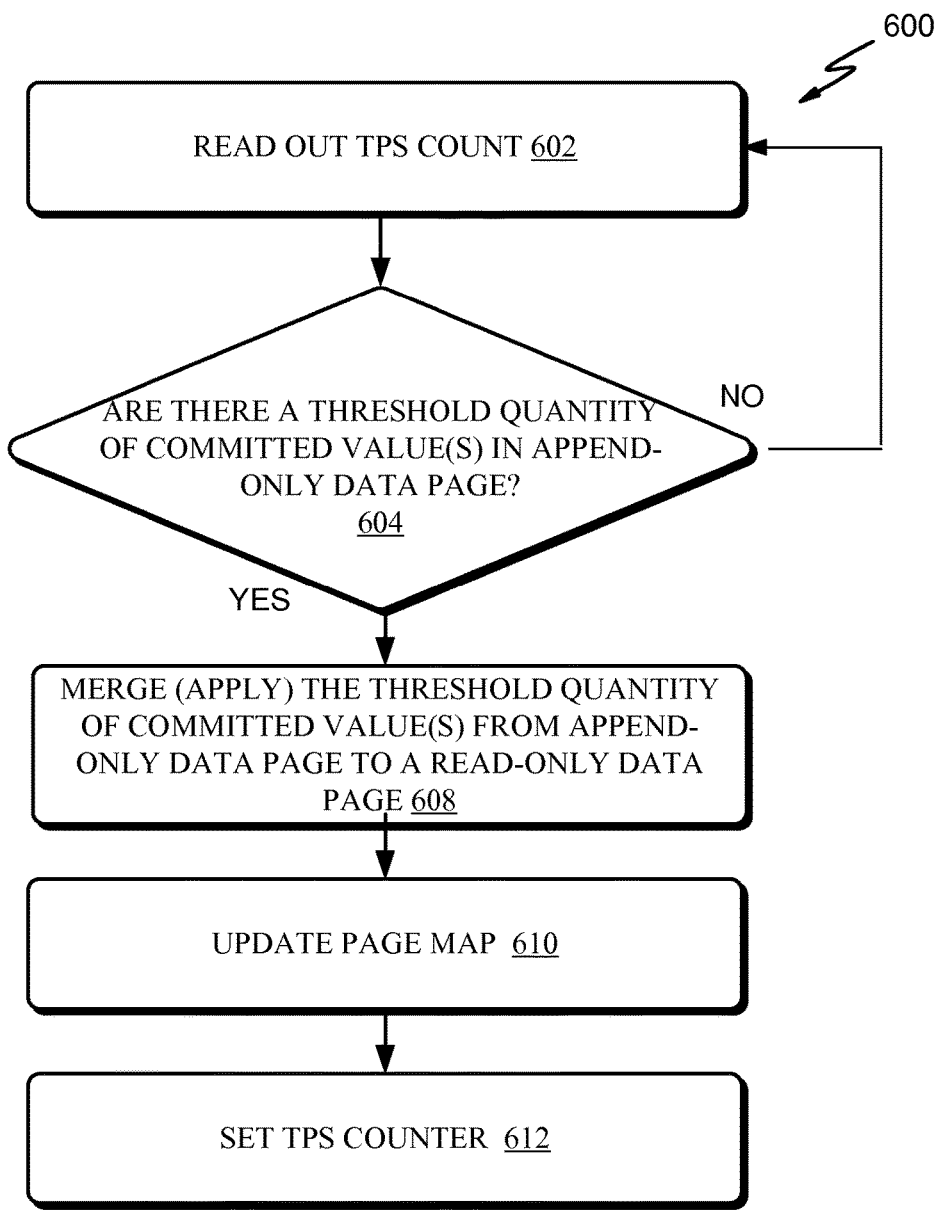
FIG. 6 is a flow diagram of an example process for merging a threshold quantity of committed values to a read-only data page.

FIG. 6 is a flow diagram of an example process 600 for merging a threshold quantity of committed values to a merged read-only data page. In some embodiments, per block 602, the process 600 may begin when a database manager reads out a TPS count (e.g., via a TPS counter) within a read-only page (e.g., polls the TPS counter every 10 minutes) to determine whether there are a threshold quantity of committed values within an append-only data page (block 604). In some embodiments, a counter within the append-only pages may read tuplestate columns (or the start time column from which we can determine whether a transaction has been committed or not) of an append-only data page to determine a raw quantity of committed values. The TPS counter may then communicate or receive information from the append-only data page counter to receive feedback on the number of committed values. Instead of or in addition to reading a tuplestate column, the database manager may provide a watermark of where the last merging sequence scan ended or last committed record was scanned for the merging sequence in order to determine what record or location to initiate a second merging sequence. In these embodiments, the watermarked location within the append-only data pages may be communicated to the TPS counter within the read-only data pages to provide a reference of the last merged scan. In an example illustration, if at a first time the database manager ended a merge sequence scan at TSN 10, the database manager may read a TPS number to begin a second merge sequence scan at TSN 11. If there is not a threshold quantity of committed values in the append-only data page, then the database manager may wait until its next scheduled polling action (e.g., repeat block 602) to determine again whether there is a threshold quantity of committed values in the append-only data page.

In some embodiments, if there is a threshold quantity of committed values in the append-only data page, the database manager may perform block 608 to merge (apply) the new committed values within the append-only data page to a read only data page (e.g., the merged read-only data page 214 of FIG. 2). In some embodiments, the database manager may perform block 608 by first reverse scanning the columns of committed values within append-only data pages to find a list of the latest version of every updated (or deleted) value since the last merge process (e.g., use a hash table to track the latest version). The database manager may then utilize a routine to load columns of the latest update version from the append-only data page to the second read-only data page. The database manager may then apply a compression algorithm on the loaded columns from both the original read-only data page and the append-only data page and write the values into the second read-only data page. In some embodiments, after the merging process and after any active transactions are finished accessing the original read-only data page, the original read-only data page may be purged away (i.e., deleted) such that additional storage space may be utilized. Further, pointers within the page map may be updated to point to the data in the second or merged read-only data page.

In some embodiments, the unmodified data within the original read-only data may be copy-on-written from a first read-only data page (e.g., read-only data page 210 of FIG. 2) to a second read-only data page (e.g., the merged read-only data page of FIG. 2). The copy-on-write operation may occur at the same time as the merge operation in block 608 or at a different time. In some situations, there may be a plurality of values that a user never requested to update and/or delete within a first read-only data page. In order for all of the data to be consolidated to a single data page, the database manager may write even the unmodified data to the same data page as the applied data from the append-only data page such that a page map may include pointers that point to the same data page, as opposed to other old data pages. This may allow future queries to only touch the second read-only data page. Alternatively, however, pointers within a page map may continue to point to old records within the first read-only data page such that queries may continue to touch the first read-only data page for old values.

Per block 610, the database manager may update page map (mapping structure). For example, a page map pointer for value X may be modified to point from the page map to value X to point to the newly merged second read-only data page for future queries. Further, unmodified data that has been merged to a second read-only data page may have a pointer originating from the page map that references the unmodified data within the second read-only data page (e.g., analogous to the forward pointer 305 of FIG. 3A).

Per block 612, the database manager may set a TPS counter. For example, the TPS counter may store the last TSN that was found to be committed during a scan of the merge process (block 608) within an append-only data page (e.g., TPS 323 of FIG. 3C). The TPS counter may additionally or instead be updated to reflect a raw quantity of updates or deletes that have occurred (e.g., 100) to the second read-only data page or be reset to 0 after a particular merge sequence (block 608).

Figure 7:
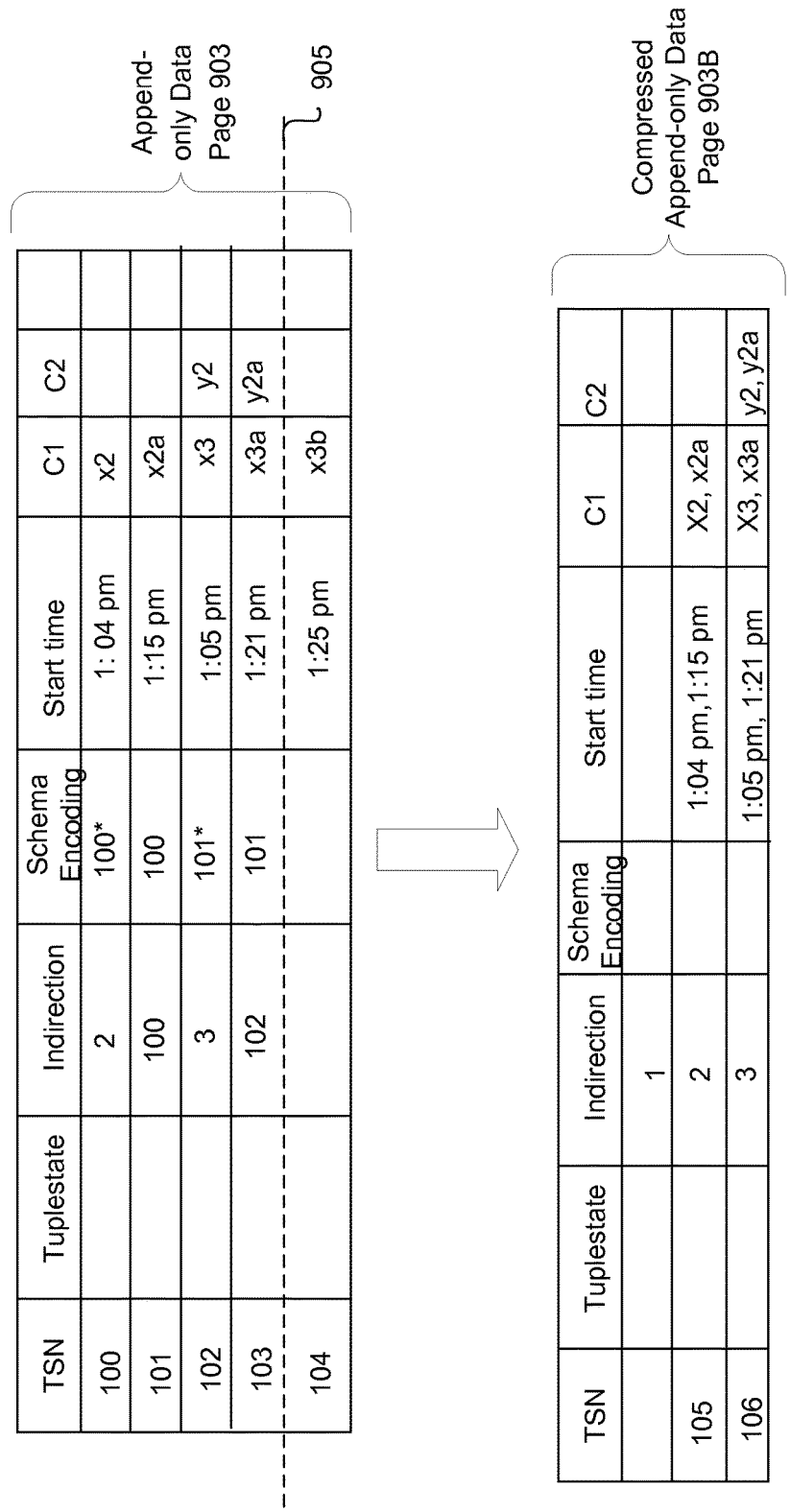
FIG. 7 is a diagram of an example append-only data page being compressed, according to embodiments.

FIG. 7 is a diagram of an example append-only data page 903 being compressed to a compressed append-only data page 903B, according to embodiments. In some embodiments, the database manager may compress, in response to the merging, the append-only data pages to reduce a size of the append-only data pages. In the example illustration of FIG. 7, a database manager may first select a given range of committed and merged TSNs within the append-only data page 903, such as TSN 100-103, which may correspond to the same range of TSNs that the database manager merged to a second read-only data page for a particular set of TSNs. In some embodiments, however, the database manager may select a different range of committed TSNs than a particular range of committed TSNs that were merged at a particular time. The watermark 905 may define the point at which the selection of records for the compression ends. For example, as illustrated in FIG. 7, after the database manager selects TSNs 100-103 for compression, another transaction may be initiated (i.e., TSN 104) that requests an update of value x3a to x3b under C1. Accordingly, concurrency may not be compromised as compressing a range of values may not affect other incoming transactions that involve the same or different data.

Consistent with FIG. 7, 4 TSNs of the append-only data page 903 (i.e., TSN 100, 101, 102, and 103) may be compressed to two TSNs (i.e., TSN 105 and 106) within the compressed append-only data page 903B. Data may thus be consolidated from a plurality of records into a single records. For example, as illustrated, for TSN 105 under C1, the two values x2, and x2a may be compressed within the same field or cell. Likewise, under C2, the two values y2, and y2a may be compressed within the same field or cell of the tuple TSN 106. Further, for TSN 106 under C1, the two values x3 and x3a may be compressed within the same field or cell. Other data may be compressed, such as start times, as illustrated in FIG. 7.

While FIG. 7 shows one example of a compression process, during the compression process the records (e.g., TSNs) may be inlined and delta-compressed (e.g., delta encoded). As disclosed herein, "inline" may refer to physically co-allocate or cluster different versions of particular values together in a particular field or cell. Delta compression may refer to the process of compactly encoding differences between two files or strings in order to reduce communication or storage costs. The compression process may be any known columnar compression process that makes use of the similarity of adjacent data and may employ, for example, LZW or run-length encoding compression schemes.

During the compression process the database manager may further remove current backward pointers (because they are inlined) and update backward pointers at a granularity of a record range, as opposed to a per-record basis. For example, a page map may include backward pointers that point to a TSN range of 100-105 within a compressed append-only data page, instead of TSN 100 individually and TSN 101 individually. Further, a data page may store forward pointers that may be updated to point to the values of the new compressed append-only data page 903B. Moreover, the old append-only data pages (e.g., append-only data page 903) may include pointers that point to the newly compressed append-only structures (e.g., compressed append-only data page 903B). Alternatively, the old append-only data pages may be purged away as long as there are no active transactions that may be reading the old append-only data pages. In some embodiments, the records in the compressed append-only data pages may be ordered in an identical manner as the order within the read-only data pages to maintain consistency within the database.

Figure 8:
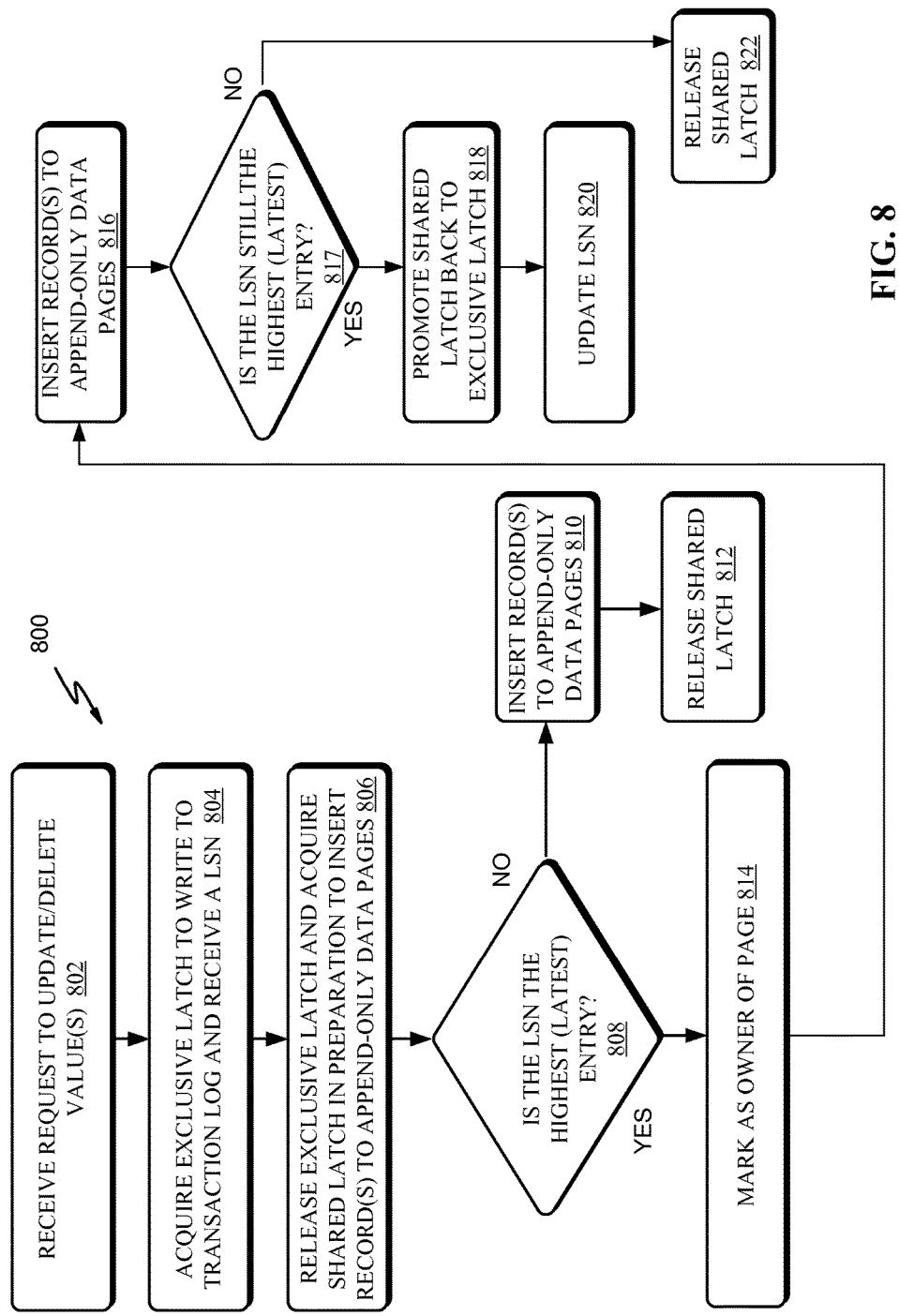
FIG. 8 is a flow diagram of an example process for implementing a concurrency control mechanism for uncommitted transactions, according to embodiments.

FIG. 8 is a flow diagram of an example process 800 for implementing a concurrency control mechanism of uncommitted transactions, according to embodiments. In various embodiments, the process 800 may correspond to control mechanisms for writing records to an append-only data page or providing in-place updates on an indirection column of a read-only data page. In some embodiments, the process 800 may correspond to an "insert" operation for new records. Although FIG. 8 illustrates that latching mechanisms may be utilized for concurrent transactions, there may be no requirement for latches for read-only data pages and committed data within append-only data pages. In some embodiments, the process 800 may begin at block 802 when a database manager receives a particular request to update and/or delete (or insert) one or more values. When the database manager receives the request, it may, per block 804, allow a user transaction to acquire an exclusive latch in order to acquire next available TSN for writing the updated/deleted/inserted record and write to a transaction log and receive a log sequence number (LSN). An exclusive latch as described herein may be a latch that allows no access to a particular data page while it is being written to (i.e., one access per data page is allowed) for purposes of writing to a transaction log. When a transaction receives the exclusive latch to a data page it may write to a transaction log indicating that a transaction has been initiated at a particular time and is in the process of being completed. For example, if an entire transaction included the operations of a "delete" of particular values and an "update" of the values, the database manager may indicate that the transaction is uncommitted (e.g., by utilizing the tuplestate column of FIG. 3A or by placing the transaction ID in the start time column) and that the delete operation has been initiated. The database manager may determine whether a particular transaction has been committed or not, and if the transaction is committed, a commitment time stamp (e.g., time when particular values have been committed).

Per block 806, before the insertion of the one or more records to append-only data pages or performing in-place updates on the read-only indirection column occurs, the writer transaction may release the exclusive latch for the data page that corresponds to the request and the data page may be subject to a shared latch. A "shared latch" as disclosed herein may mean that an unlimited quantity of substantially concurrent transactions can access a particular set of data, assuming that the set of data (e.g., record) being read or changed is not being changed by other transactions. The term "substantially concurrent" within a latching context may mean that a first transaction may be initiated (but still uncommitted), and a second transaction may shortly thereafter (e.g., 1 second after the first transaction has been initiated) be initiated while the first transaction is in an active state. A shared latch may be provided because different reader transactions may read data that is already committed (unless the read is a dirty data read) within a read-only data page and therefore require no exclusive latching. Further, every write transaction update may correspond to inserting corresponding records within the append-only data pages according to a pre-determined and pre-allocated part of a data page (e.g., FIGS. 3A and 3B).

Per block 808, the database manager may determine whether the LSN is the highest or latest entry. For example, a first-in-time transaction for data within a first data page may include LSN of 1 for initiating a transaction first, a second-in-time transaction for data within the first data page may include an LSN of 2 for initiating a transaction second, etc.

Per block 810, if the LSN is not the latest entry (i.e., there are other transactions that have been initiated after the current transaction in process 800), then the database manager may continue to complete the request and insert record(s) to the append-only data pages (or update values on read-only indirection column), which corresponds to the actual updating and/or deleting of particular values. The database manager may then, per block 812, release the shared latch for the transaction that corresponds to the LSN such that the shared latch may be applied to a different transaction. For example, if a data page included 4 different transactions in parallel, and each transaction held a shared latch, after the insertion of records to the append-only data page by a first transaction (e.g., block 810), the shared latch for the first transaction may be released such that only 3 transactions may now hold a shared latched instead of 4 transactions. Further, the updating of the LSN for the insertion of the record(s) to the append-only data page may not occur, but the LSN may only be updated by the data page owner, as described in more detail below.

Per block 814, if the LSN of the current transaction is the latest entry then the database manager may mark the corresponding data page indicating that a particular transaction is an owner of the data page. An owner of a data page may mean that one transaction has exclusive control and/or a final determination of what transaction will update a particular LSN for a given data page. Per block 816, the database manager may then insert one or more records into the append-only data page. Alternatively, block 816 may correspond to inserting values within an indirection column In some embodiments, the database manager per block 817 may check again whether the LSN is still the latest entry. The database manager may perform block 817 because a particular transaction may have been initiated between blocks 816 and 818 and therefore employ a higher LSN. If the particular LSN is not still the latest entry (i.e., a separate transaction has been initiated), then per block 822 the database manager may release the shared latch for the corresponding transaction.

If the particular LSN is still the latest entry, then per block 818, the database manager may promote the shared latch for the transaction with the latest entry back to an exclusive latch. The exclusive latch in block 818 may allow the transaction with the latest LSN to perform block 820 to update a particular LSN (e.g., log a transaction as committed). For example, if there were 5 concurrent transactions involving data on the same data page, the latest-in-time initiated transaction (corresponding to the latest LSN) that completes a modification (i.e., an update and/or delete) may be written to a transaction log instead of any of the earlier initiated 4 other transactions.

In some embodiments, after block 818, data pages can be re-formatted and additional slots may be allocated. Further, reader transactions may also acquire a shared latch to access the append-only data pages if writer transactions holding an exclusive latch can shift data around in the data page or reformat the data page. If the writer transaction only updates LSN when promoting to exclusive latch, then readers may not need to acquire shared latch when accessing the data page.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for updating a database, the method comprising:
receiving, by a database manager executing within a computing device, a first request to update a first set of values, the first set of values stored at a first location within a first data page of a database, wherein the first data page includes a first start time column, the first start time column specifying a commit time of a first transaction that originally wrote the first set of values to the first data page, wherein the first location is read-only;
in response to at least the receiving of the first request, inserting, by the database manager, a first set of records into a second data page, wherein the first set of records include the update of the first set of values, wherein the second data page includes a second start time column, the second start time column including a transaction id indicating when a second transaction associated with the first request began;
identifying, by the database manager, one or more committed values on the second data page;
in response to the identifying, merging, by the database manager, the one or more committed values from the second data page to a third data page;
receiving, by the database manager, a second request to update a second set of values at the first location within the first data page at substantially a same time as the merging, wherein the merging is not blocking the second request;
in response to the receiving of the second request, inserting, by the database manager, a second set of records into the second data page;
storing, by the database manager, a forward pointer in the first data page that points to the first set of records on the second data page.

2. The method of claim 1, further comprising compressing, in response to the merging, the second data page by consolidating data within a plurality of records of the second data page into a single record.

3. The method of claim 1, wherein the second data page is an append-only data page.

4. The method of claim 1, further comprising:
receiving a third request to read a third set of values, the third request specifying a snapshot time to read the third set of values, wherein the third set of values are an older version of the first set of values;
determining that the third set of values are within the second data page; and
accessing the third set of values from the second data page.

5. The method of claim 1, further comprising:
receiving a third request to access a third set of database values within the first data page, the third request being substantially concurrent with the first request, wherein the first request is associated with a first transaction and the third request is associated with a third transaction;
providing an exclusive latch to the first transaction to write to a transaction log, wherein the first transaction receives a log sequence number (LSN);
releasing the exclusive latch, subsequent to the receiving of the log sequence number, and providing a shared latch for the first transaction and the third transaction;
determining that the LSN is a latest entry;
in response to the determining that the LSN is the latest entry, marking the first transaction as an owner of the first data page, wherein the inserting the first set of records is further in response to the determining that the LSN is the latest entry; and
promoting the shared latch back to the exclusive latch, wherein the first transaction updates the LSN.

6. A system for updating a database, the system comprising:
a computing device having a processor and a memory;
wherein the memory stores program instructions, the program instructions executable by the processor cause the system to:
receive a first request to update a first set of values, the first set of values stored at a first location within a first data page of a database, wherein the first location is read-only, and wherein the first data page includes a first start time column, the first start time column specifying a commit time of a first transaction that originally wrote the first set of values to the first data page;
in response to the receiving of the first request, insert a first set of records into a second data page, wherein the first set of records include the update of the first set of values, wherein the second data page includes a second start time column, the second start time column including a transaction id indicating when a second transaction associated with the first request began, the second data page is an append-only data page configured to add data, wherein the append-only data page is further configured to retain the added data such that the added data cannot be removed, wherein no locks or exclusive latches associated with the first request are utilized at a particular time to allow a second request to modify the first set of values;
identify one or more committed values on the second data page;
in response to the identifying, merge the one or more committed values from the second data page to a third data page;
receive a second request to update a second set of values at the first location within the first data page at substantially a same time as the merging, wherein the merging is not blocking the second request;
in response to the receiving of the second request, insert a second set of records into the second data page; and
store a forward pointer in the first data page that points to the first set of records on the second data page.

7. The system of claim 6, wherein the program instructions executable by the processor further cause the system to compress, in response to the merging, the second data page by consolidating data within a plurality of records of the second data page into a single record.

8. The system of claim 6, wherein the program instructions executable by the processor further cause the system to:

receive a third request to read a third set of values, the third request specifying a snapshot time to read the third set of values, wherein the third set of values are an older version of the first set of values;

determine that the third set of values are within the second data page; and access the third set of values from the second data page.

9. The system of claim 6, wherein the first data page includes a first column and the second data page includes a second column, the first column and the second column storing information about which column values have been updated.

10. A computer program product comprising a non-transitory computer readable storage medium having program code embodied therewith, the program code comprising computer readable program code configured for:

receiving a first request to delete a first set of values, the first set of values stored at a first location within a first data page of a database, wherein the first data page includes a first start time column, the first start time column specifying a commit time of a first transaction that originally wrote the first set of values to the first data page, wherein the first location is read-only;

in response to the receiving of the first request, inserting a first set of records into a second data page, wherein the first set of records include the delete of the first set of values, wherein the second data page includes a second start time column, the second start time column including a transaction id indicating when a second transaction associated with the first request began;

identifying one or more committed values on the second data page;

in response to the identifying, merging the one or more committed values from the second data page to a third data page;

receiving a second request to update a second set of values at the first location within the first data page at substantially a same time as the merging, wherein the merging is not blocking the second request;

in response to the receiving of the second request, inserting a second set of records into the second data page;

storing a forward pointer in the first data page that points to the first set of records on the second data page; and storing a tuplestate column value within the first data page, wherein the tuplestate column value indicates whether a particular value is committed or not committed.

11. The computer program product of claim 10, wherein the second data page is an append-only column-oriented data page that stores only particular columns of values that have been updated.

* * * * *